Figure 2A:
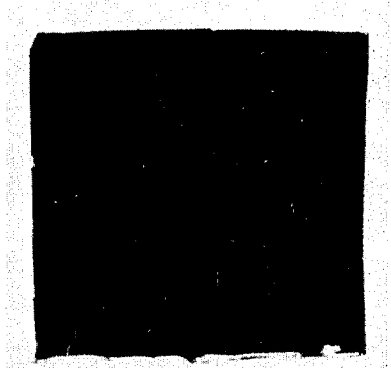

United States Patent [19]

Ariyoshi et al.

[11] Patent Number: 4,511,679
[45] Date of Patent: Apr. 16, 1985

[54] PROCESS FOR PREPARING A RUBBER-ASPHALT COMPOSITION

[75] Inventors: Takashi Ariyoshi, Kudamatsu; Noriaki Emura, Tokuyama; Yasuhiro Sakanaka, Shin-nanyo, all of Japan

[73] Assignee: Toyo Soda Manufacturing Co., Ltd., Shin-nanyo, Japan

[21] Appl. No.: 561,799

[22] Filed: Dec. 15, 1983

[30] Foreign Application Priority Data

Dec. 21, 1982 [JP] Japan .................. 57-222919

[51] Int. Cl.³ .............................. C08J 9/10
[52] U.S. Cl. ...................... 521/83; 521/84.1; 521/94; 521/95; 521/101; 521/109.1; 521/139; 521/140
[58] Field of Search ............. 521/83, 109.1, 84.1, 521/94, 95, 140, 139, 101

[56] References Cited

U.S. PATENT DOCUMENTS

| | | | |
|---|---|---|---|
| 1,371,016 | 3/1921 | Bennett et al. | 521/83 |
| 2,166,236 | 7/1939 | Crawford | 521/83 |
| 2,271,498 | 1/1942 | Overstreet | 521/83 |
| 2,323,936 | 7/1943 | Roberts | 521/83 |
| 2,807,596 | 9/1957 | Flickinger | 521/83 |
| 2,981,361 | 4/1961 | Schofield | 521/83 |
| 3,177,164 | 4/1965 | Mills et al. | 521/83 |
| 3,725,315 | 4/1973 | Bauer | 521/83 |
| 3,853,684 | 12/1974 | Rubens | 521/83 |
| 4,010,123 | 3/1977 | Blunt et al. | 521/83 |

FOREIGN PATENT DOCUMENTS

| | | |
|---|---|---|
| 735301 | 8/1955 | United Kingdom . |
| 1269302 | 5/1972 | United Kingdom . |
| 1399154 | 6/1975 | United Kingdom . |
| 1422738 | 2/1976 | United Kingdom . |

Primary Examiner—Morton Foelak
Attorney, Agent, or Firm—Oblon, Fisher, Spivak, McClelland & Maier

[57] ABSTRACT

A process for preparing a rubber-asphalt composition, which comprises blending a particulate or powdery rubber composition comprising 100 parts by weight of a particulate or powdery rubber having a particle size of at most 2 mm and from 0.1 to 50 parts by weight of a particulate or powdery blowing agent having a particle size of at most 1 mm, with asphalt containing from 0.1 to 30 parts by weight of an organic base, based on 100 parts by weight of the asphalt.

7 Claims, 9 Drawing Figures

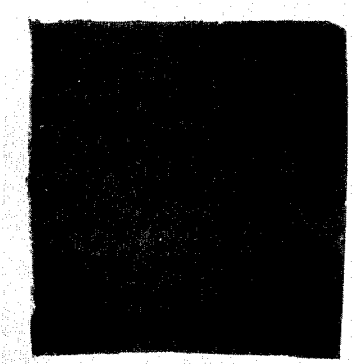
FIGURE I(c)
FIGURE I(f)
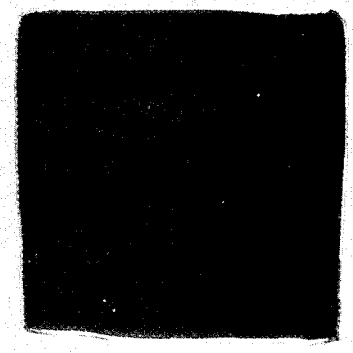
FIGURE I(b)
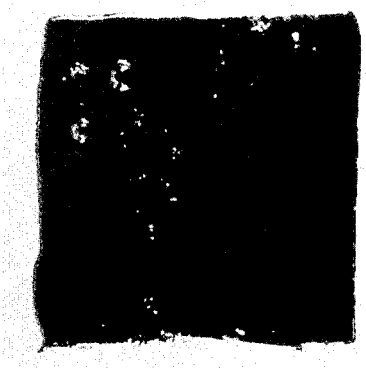
FIGURE I(e)
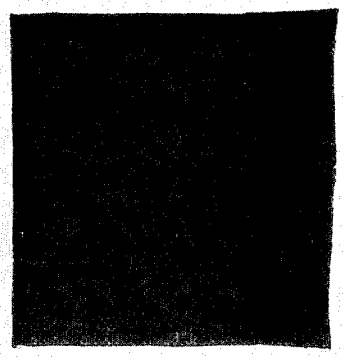
FIGURE I(a)
FIGURE I(d)

PROCESS FOR PREPARING A RUBBER-ASPHALT COMPOSITION

The present invention, relates to a process for preparing a rubber-asphalt composition wherein a particulate or powdery rubber is blended directly with asphalt.

When asphalt is to be used for paving a road or a rooftop, it is common to modify asphalt by blending and dissolving thereto about 5 parts by weight of rubber, based on 100 parts by weight of the asphalt. As such a method, it is common to employ a process which comprises adding a rubber latex containing about 50% of water to asphalt at a temperature of from 100° to 200° C., and then evaporating water to dissolve the rubber. When such a rubber latex is added to asphalt, an operation for evaporating water is required. Such a process is uneconomical as it involves energy consumption required to evaporate water. Further, the process is uneconomical also from the viewpoint of transportation since it is required to transport an excess amount of water contained in the rubber latex. Under the circumstances, there have been proposed various methods whereby rubber is blended directly with asphalt.

For instance, there has been proposed a method wherein a rubber-asphalt master batch is pelletized and then added to asphalt, or a method wherein a particulate or powdery rubber composition obtained by blending an inorganic material such as talc, calcium carbonate or clay with a particulate or powdery rubber in an amount of about 20 parts by weight based on 100 parts by weight of the rubber, is employed. The former method requires two steps, i.e. a step for preparing the rubber-asphalt master batch and a step for pelletizing. Whereas, the latter method has drawbacks in that the asphalt contains an inorganic material and that a long period of time is required to dissolve the rubber. For these reasons, it is still common to employ the process wherein a rubber latex is used.

As a result of extensive researches to overcome the above-mentioned drawbacks, the present inventors have found that when a particulate or powdery rubber composition obtained by blending a blowing agent with a particulate or powdery rubber, is added to asphalt containing an organic base, the rubber can readily be dissolved without forming agglomerates. The present invention has been accomplished based on this discovery.

Thus, the present invention provides a process for preparing a rubber-asphalt composition, which comprises blending a particulate or powdery rubber composition comprising 100 parts by weight of a particulate or powdery rubber having a particle size of at most 2 mm and from 0.1 to 50 parts by weight of a particulate or powdery blowing agent having a particle size of at most 1 mm, with asphalt containing from 0.1 to 30 parts by weight of an organic base, based on 100 parts by weight of the asphalt.

Now, the present invention will be described in detail with reference to the preferred embodiments.

In the accompanying drawings,

FIGS. 1(a) to 1(f) are photographs of the top surfaces of the layers formed with the rubber-asphalt compositions of Examples 1 to 3 and Comparative Examples 1 to 3, respectively.

Figure 2B:
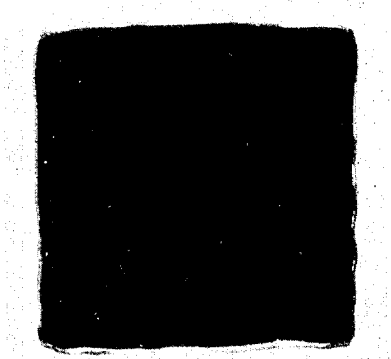
Figure 2C:
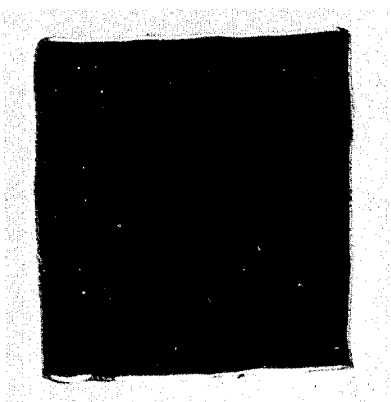

FIG. 2(a) to 2(c) are photographs of the top surfaces of the layers formed with the rubber-asphalt compositions of Examples 4 to 6, respectively.

The blowing agent is added to the rubber in an amount of from 0.1 to 50 parts by weight, preferably from 2 to 10 parts by weight, based on 100 parts by weight of the rubber, to obtain a rubber composition suitable for blending with asphalt.

If the amount of the blowing agent is less than 0.1 part by weight, no adequate effectiveness for blending and dissolving the rubber in the asphalt is obtainable, whereby the rubber tends to agglomerate in the asphalt. On the other hand, if the amount exceeds 50 parts by weight, the period of the foam generation by the blowing agent in the asphalt will be prolonged, whereby a long period of time will be required for the blending and dissolving operation.

The amount of the organic base to be added to the asphalt is from 0.1 to 30 parts by weight, preferably from 2 to 7 parts by weight, based on 100 parts by weight of the asphalt. If the amount of the organic base is less than 0.1 part by weight, a long period of time will be required for dissolving the rubber. On the other hand, if the amount exceeds 30 parts by weight, it is likely that the physical properties of the rubber-asphalt composition will be deteriorated.

The temperature of the asphalt at the time of blending the rubber composition with the asphalt is preferably from 60° to 200° C., whereby the operation for blending and dissolving the rubber can readily be conducted and the time for this operation can be shortened.

The asphalt in the present invention is meant for petroleum asphalt which is commonly used for pavement of roads, waterway structures, water-proof means, electric insulators and various other industrial applications. In the case of straight asphalt, it is meant for asphalt having a needle-penetration rate of from 0 to 300 as measured in accordance with JIS K 2207 "Petroleum Asphalt", and in the case of blown asphalt, it is meant for asphalt having a needle-penetration rate of from 0 to 40 as measured in the same manner.

If the temperature of the asphalt is lower than 60° C., the viscosity of the asphalt is high, and the blending and dissolving operation of the rubber will be difficult. On ther other hand, if the temperature exceeds 200° C., it is likely that the rubber undergoes decomposition in the asphalt, thus leading to deterioration of the physical properties of the rubber-asphalt composition.

The blowing agent to be used in the present invention may be a blowing agent which is commonly employed in various industrial fields such as rubber industry, resin industry or food industry. It is preferably an inorganic or organic blowing agent having a decomposition temperature of at most 200° C. and a particle size of at most 1 mm. For instance, there may be mentioned ammonium bicarbonate, N,N'-dinitrosopentamethylenetetramine, azodicarbonamide, azobis-isobutyronitrile, benzene sulfonyl hydrazide and toluene sulfonyl hydrazide.

The process of the present invention is usually conducted at an asphalt temperature of from 60° to 200° C., and accordingly it is possible to use a blowing agent having a decomposition temperature of not higher than 200° C. However, it is preferred to use a blowing agent having a decomposition temperature lower than the asphalt temperature, whereby the blending and dissolving the rubber into the asphalt can be facilitated. When a blowing agent having a decomposition temperature of higher than 200° C., it is likely that the rubber is hardly blended or dissolved in the asphalt, and the rubber tends to agglomerate in the asphalt.

Further, if the particle size of the blowing agent exceeds 1 mm, a uniform composition is hardly obtainable by the operation for blending the rubber with the blowing agent, and it is likely that the rubber forms agglomerates in the asphalt.

As the particulate or powdery rubber having a particle size of at most 2 mm, there may be mentioned one which is obtained by a process which comprises mixing an anionic water-soluble polymer to an anionic or non-ionic rubber latex, then mixing thereto a cationic polymer or a cationic surfactant capable of forming coacervation with the anionic water-soluble polymer, thereby to separate rubber particles from the rubber latex, and then adding and mixing a synthetic resin emulsion therewith, followed by dehydration and drying. Such a process is disclosed, for instance, in Japanese Unexamined Patent Publication No. 73244/1978.

As the particulate or powdery rubber to be used in the present invention, there may be mentioned natural rubber or rubbers obtainable from anionic or nonionic latexes, for instance, a homopolymer of a conjugated diene compound such as isoprene, butadiene or chloroprene, which can be prepared by a conventional emulsion polymerization, e.g. polyisoprene rubber, polybutadiene rubber or polychloroprene rubber; a copolymer of the above-mentioned conjugated diene compound with a vinyl compound such as styrene, acrylonitrile, vinyl pyridine, acrylic acid, methacrylic acid, an alkylacrylate or an alkylmethacrylate, e.g. styrene-butadiene copolymer rubber, acrylonitrilebutadiene copolymer rubber, vinyl pyridine-butadienestyrene copolymer rubber, acrylic acid-butadiene copolymer rubber, methylacrylate-butadiene copolymer rubber or methylmethacrylate-butadiene copolymer rubber; or a copolymer of a diene compound with an olefin such as ethylene, propylene or isobutylene, e.g. isobutyleneisoprene copolymer rubber.

If the particle size of the rubber exceeds 2 mm, a long period of time will be required for blending the rubber, whereby it is likely that the decomposition of the rubber will be led, and the physical properties of the rubber-asphalt composition tends to be deteriorated.

The organic base includes higher amines of primary amines, tertiary amines and polyamines, and their derivatives and quaternary ammonium salts. For instance, the higher amines of primary amines include dodecylamine, a coconut oil alkylamine, tetradecylamine, hexadecylamine and a beef tallow alkylamine. As the higher amines of tertiary amines, there may be mentioned dodecyldimethylamine, a coconut oil alkyldimethylamine, tetradecyldimethylamine and octadecyldimethylamine. As the higher amines of polyamines, there may be mentioned a beef tallow alkylpropylenediamine, polyvinylpyridine, polybenzylamino cellulose and polydiethylaminoethylstyrene. As the derivatives of the higher amines, there may be mentioned oxyethylenedodecylamine, polyoxyethyleneoctadecylamine and a polyoxyethylene beef tallow alkylamine. As the quaternary ammonium salts, there may be mentioned dodecyltrimethylammonium chloride and hardened beef tallow alkyltrimethylammonium chloride.

Now, the present invention will be described in further detail with reference to Examples. However, it should be understood that the present invention is by no means restricted by these specific Examples. The particulate or powdery rubbers used in the Examples were prepared in accordance with the process for producing powdery rubber as disclosed in Japanese Unexamined Patent Publication No. 73244/1978. In the Examples, "parts" means "parts by weight".

EXAMPLES 1 to 3

1. Polychloroprene rubber

A polychloroprene rubber latex (a latex of "Skyprene B-30", trade name, manufactured by Toyo Soda Manufacturing Co., Ltd.) was adjusted to bring its dry weight to 35% by weight. To 20 parts of this rubber latex, 20 parts of an aqueous solution containing 1% by weight of sodium alginate was added, and then an aqueous solution containing 10% of acetic acid was added to bring the pH to 4.5. This mixed solution was dropwise added to 200 parts of an aqueous solution containing 0.1% by weight of polyoxyethylene beef tallow alkylpropylenediamine. Then, the rubber separated in a fine powdery form was washed by decantation. To the aqueous solution in which the rubber was dispersed in a fine powder state, a polystyrene emulsion was added in an amount of 6% by weight relative to the dry weight of the rubber latex and mixed. The mixture was subjected to dehydration and drying, whereupon powdery polychloroprene rubber was obtained.

2. Styrene-butadiene copolymer rubber

A styrene-butadiene copolymer rubber latex ("JSR 0561", trade name, manufactured by Japan Synthetic Rubber Co., Ltd.) was adjusted to bring its dry weight to 35% by weight. Then, in the same manner as in the above method 1, a powdery styrene-butadiene copolymer rubber was prepared.

3. Acrylonitrile-butadiene copolymer rubber

A acrylonitrile-butadiene copolymer rubber latex ("Nipol 5157", trade name, manufactured by Nippon Zeon Co., Ltd.) was adjusted to bring its dry weight to 35% by weight. Then, in the same manner as in the above method 1, a powdery acrylonitrile-butadiene copolymer rubber was obtained.

In a stainless steel container equipped with a stirrer, asphalt was heated to 160° C. and stirred, and an organic base was added to the asphalt in an amount of 3 parts based on 100 parts of the asphalt. Then, 5 parts of a blowing agent was added to 100 parts of each of the powdery rubbers prepared by the above methods 1 to 3. 5 Parts of the powdery rubber composition thereby obtained was added to 100 parts by weight of the asphalt, and the mixture was stirred for 10 minutes. The blowing agent used was azobis-isobutyronitrile. The organic base was polyoxyethylene beef tallow alkylpropyrenediamine. The asphalt was straight asphalt "60-80".

To ascertain whether or not rubber agglomeration exists in the rubber-asphalt composition, the rubber-asphalt composition of 160° C. was spread in a thickness of from 2 to 3 mm on a flat plate, and the determination was made by observation with naked eyes. The rubber-asphalt compositions of the Examples 1 to 3 showed a smooth surface where no rubber agglomeration was observed, as shown in FIGS. 1(a) to 1(c).

Further, the physical properties of the rubber-asphalt compositions obtained by Examples 1 to 3 were measured in accordance with JIS K-2207. The results thereby obtained are shown in Table 1.

COMPARATIVE EXAMPLES 1 to 3

The respective operations were conducted in the same manner as in Examples 1 to 3 except that the asphalt was heated to 160° C. and 4.8 parts of powdery rubber was added to 100 parts of the asphalt. It was clearly observed even by naked eyes that powdery rubber agglomerates were scattered over the surface of each rubber-asphalt composition. FIGS. 1(d) to 1(g) show photographs of the surfaces of the layers of the respective compositions of Comparative Examples 1 to 3.

TABLE 1

|  | Example 1 Powdery polychloroprene rubber | Example 2 Powdery styrene-butadiene copolymer rubber | Example 3 Powdery acrylnitrile-butadiene copolymer rubber |
| --- | --- | --- | --- |
| Needle penetration (25° C., 100 g, 5 seconds) | 82 | 59 | 80 |
| Softening point °C. | 58 | 55 | 64 |
| Elongation (5° C.) cm | 45 | 20 | 40 |
| Elongation (10° C.) cm | 89 | 55 | 76 |

EXAMPLES 4 to 6

By using the blowing agent and organic bases shown in Table 2, the powdery polychloroprene rubber as used in Example 1 was dissolved in asphalt. The presence or absence of the rubber agglomerates was determined by observation with naked eyes. It was found that each of the rubber-asphalt composition presented a smooth surface where no rubber agglomerates were observed, as shown in FIGS. 2(a) to 2(c).

TABLE 2

|  | Blowing agent | Organic base |
| --- | --- | --- |
| Example 4 | Toluene sulfonyl hydrazide | Hexadecyldimethylamine |
| Example 5 | Azodicarbonamide | Polyoxyethylene-dodecylamine |
| Example 6 | N,N'—dinitrosopentamethylene-tetramine | Quinoline |

We claim:

1. A process for preparing a rubber-asphalt composition, which comprises blending a particulate or powdery rubber composition comprising 100 parts by weight of a particulate or powdery rubber having a particle size of at most 2 mm and from 0.1 to 50 parts by weight of a particulate or powdery blowing agent having a particle size of at most 1 mm, with asphalt composition containing from 0.1 to 30 parts by weight of an organic base from the group consisting of higher amines of primary amines, tertiary amines, polyamines and their derivatives and quanternary ammonium salts, based on 100 parts by weight of the asphalt, wherein the rubber composition is blended with the asphalt composition at a temperature of from 60° to 200°.

2. The process according to claim 1, wherein the blowing agent is an inorganic or organic blowing agent having a decomposition temperature of not higher than 200° C.

3. The process according to claim 1, wherein the blowing agent is ammonium bicarbonate, N,N'-dinitrosopentamethylenetetramine, azodicarbonamide, azo-bis-isobutylonitrile, benzene sulfonyl hydrazide or toluene sulfonyl hydrazide.

4. The process according to claim 1, wherein the particulate or powdery rubber is natural rubber, polyisoprene rubber, polybutadiene rubber, polychloroprene rubber, styrene-butadiene copolymer rubber, acrylonitrile-butadiene copolymer rubber, vinylpyridinebutadiene-styrene copolymer rubber, acrylic acidbutadiene copolymer rubber, methylacrylate-butadiene copolymer rubber, methylmethacrylate-butadiene copolymer rubber or isobutylene-isoprene copolymer rubber.

5. The process according to claim 1, wherein the organic base is polyvinyl pyridine, polybenzylamino cellulose, polydiethylaminoethylstyrene, polyvinylbenzylamine, dodecyltrimethylamine, coconut oil alkyldimethylamine, hardened beef tallow alkylpropylenediamine, dodecylamine, cetylamine, stearylamine or hardened beef tallow alkylamine.

6. The process according to claim 1, wherein the rubber composition contains from 2 to 10 parts by weight of the blowing agent, based on 100 parts by weight of the rubber.

7. The process according to claim 1, wherein the asphalt contains from 2 to 7 parts by weight of the organic base, based on 100 parts by weight of the asphalt.

* * * * *